United States Patent Office 3,337,649
Patented Aug. 22, 1967

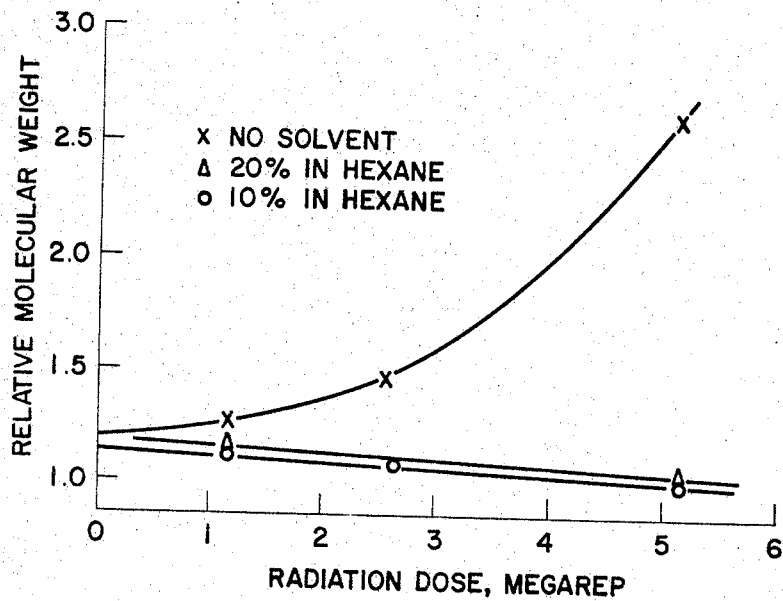

3,337,649
GRAFT COPOLYMER PREPARATION THROUGH FREE RADICALS
James F. Black, Convent, N.J., and Israel S. Ungar, Columbus, Ohio, assignors, by direct and mesne assignments, to Esso Research and Engineering Company, Elizabeth, N.J., a corporation of Delaware
Filed Sept. 27, 1960, Ser. No. 58,817
3 Claims. (Cl. 260—877)

This invention relates to the preparation of valuable copolymers by grafting certain polymerizable monomers to polymeric materials with the aid of high energy ionizing radiation. The invention is particularly concerned with a method of preparing grafted copolymers in which a backbone polymer is irradiated in solution to form frozen free radical sites after which a reactive monomer is attached to the backbone polymer at those sites.

Polymers and copolymers of various organic materials find wide commercial use, as for example, in plastics, coating materials, synthetic drying oils, synthetic rubber and the like. Many copolymers that are mineral-oil-soluble have been found useful as additives for heating oils to improve their sludge dispersant characteristics and as additives for lubricating oils wherein they serve as viscosity index improvers, detergents, and pour point depressants.

One class of copolymers that is of particular interest is that known as graft copolymers. Such copolymers are characterized by a structure wherein side chains of polymeric proportions are chemically tied at random points to a backbone structure that is also of polymeric proportions. The side chains and the backbone originate from different monomers.

A random copolymer of monomers A and B has a structure that can be represented by a formula such as:

whereas a graft copolymer structure may be represented by a formula such as:

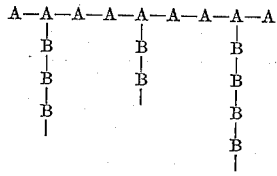

It has previously been established that graft copolymers can be prepared by forming free radical sites along a polymer chain by exposing the solid polymer to high energy ionizing radiation and subsequently contacting the irradiated polymer with a reactive monomer. The monomer polymerizes as side chains that attach themselves at the locations where the free radical sites exist. Prior art procedures have required that the polymer be irradiated in solid form in order to preserve the free radical sites. The irradiated solid polymer is then dissolved, or swollen by the liquid monomer that is to be grafted onto it. Alternatively the polymer is irradiated in the form of a film which is then subsequently exposed to the monomer that is to be graft polymerized on the surface of the film.

In accordance with the present invention, it has been found that the backbone polymer need not be irradiated in the solid state in order to participate in a frozen free radical type of grafting copolymerization process. It has now been found that the backbone polymer may be dissolved in a suitable solvent and then irradiated. The subsequent grafting can be conducted in the same solution. This procedure possesses a distinct advantage over prior art processes because it permits a much more accurate control of the length of the side chains that are attached in the grafting process and minimizes the formation of homopolymers of the grafting monomer. It also suppresses cross-linking, which leads to oil-insolubility. Thus, since it provides means for controlling oil-solubility, this method of preparation is of particular importance in the synthesis of polymers intended for use as lubricating oil additives.

The prevention of cross-linking is illustrated in the drawing, which is a graphical presentation of relative molecular weights of polyoctyl acrylate samples irradiated alone and in solution versus radiation dose, using gamma radiation. When polyoctyl acrylate is irradiated alone, considerable cross-linking occurs, whereas when it is irradiated in solution it remains essentially unchanged in molecular weight.

In practicing this invention, a solution of the backbone polymer in a suitable solvent such as benzene is subjected to high energy ionizing radiation under conditions promoting the formation of frozen free radical sites after which the irradiated solution is removed from the source of radiation and placed into contact with a suitable monomer that is to be grafted as side chains, conditions being such as to promote the grafting reaction. Subsequently, the graft copolymer is recovered by distilling from it the solvent and any unreacted monomer.

The high energy ionizing radiation may be supplied by naturally occurring radioactive materials, such as radium and its compounds, which emit alpha, beta and gamma rays. Fission by-products of processes generating atomic power and/or fissionable materials which emit high energy gamma rays, afford a highly desirable and most abundant source of radioactivity suitable for the purposes of the invention. These by-products include elements with atomic numbers ranging from 30 (zinc) to 63 (europium) and their compounds. They are formed in the course of converting uranium, plutonium and other fissionable material in an atomic reactor. Ionizing radiation from such sources has an energy equivalent to at least 30 electron volts.

Materials made radioactive by exposure to neutron radiation, such as radioactive cobalt (Co 60), europium 152 or europium 154, which emit gamma rays, may likewise be used. Suitable sources of high velocity electrons are also the beams of electron accelerators, such as the Van de Graaf generator or the Betatron. In general, however, high intensity gamma radiation and its well-known sources, such as nuclear fission by-products and materials made radioactive by neutron radiation, are particularly preferred for the purposes of the invention mainly because of the relatively high penetrating power of the gamma rays and the availability and ease of application of these sources of gamma radiation. Also, a combination of gamma rays and neutrons is a preferred type of radiation.

The polymer backbone employed in practicing the present invention may be a homopolymer, i.e., a polymeric material that originates from a single constituent monomer or it may be a copolymer of two or more constituent monomers. The molecular weights of the backbone polymers may vary within fairly wide limits and will depend to a large extent upon the size and nature of the graft copolymer that is desired.

In general, the molecular weights of the starting polymer backbones used in this invention will range from about 500 to about $5 \times 10^6$ (Staudinger molecular weights).

The monomers that may be used for preparing the polymeric backbones or for the subsequent grafting step may include monoolefins, diolefins, haloolefins, esters of acrylic and methacrylic acid, vinyl esters, vinyl ethers, esters of alpha, beta-unsaturated dibasic acids, and unsaturated nitriles. Specific monomers include isobutylene, styrene, butadiene, isoprene, vinyl chloride, methyl acrylate, methyl methacrylate, lauryl methacrylate, vinyl acetate, vinyl isobutyl ether, octyl fumarate, acrylonitrile, vinyl $C_8$ Oxo alcohol ether, vinyl isobutyrate, vinyl pyrrolidone, and others.

Vinyl type polymers, e.g., vinyl esters or esters of acrylic or methacrylic acid are particularly suitable as backbone polymers. Vinyl type compounds are also preferred as the grafting monomers and include vinyl ethers, vinyl esters, vinyl acylates, vinyl pyridine, vinyl pyrrolidone, acrylonitrile, and vinyl carbazole.

The polymer chains useful as backbones for grafting according to the method of this invention may be prepared by any one of the appropriate techniques well known to the art, using catalysts appropriate to the system. Such catalysts include metal alkyls, Friedel-Crafts catalysts, peroxides, and free radical catalysts. Backbone polymers may, in some cases, be prepared by ionizing radiation without the use of catalysts. The method of backbone polymer preparation is not limiting.

The highly viscous backbone polymer solution that is irradiated in accordance with the present invention can contain from 10 to 95 weight percent of solvent. Preferably, the solvent content is in the range of about 50 to 90 weight percent. The solvent used should be one that has a low radical yield in the presence of ionizing radiation. For this reason, benzene is preferred to toluene or to aliphatic solvents.

The irradiation should be conducted at relatively low temperatures, i.e. at least below 100° F. and preferably as low as 40° F. or less. Radiation intensity should be relatively high since free radicals decay with time fairly rapidly. Dosage rates of from 0.01 to 100 megarep per minute may be used, but are preferably in the range of 0.1 to 10 megarep per minute. Radiation periods of from 1 to 300 minutes may be employed and are preferably in the range of 1 to 60 minutes. Total dosages may range from $1 \times 10^5$ to $1 \times 10^9$ rep but are preferably within the limits of $5 \times 10^6$ to $1 \times 10^8$ rep.

After irradiation of the backbone polymer solution has been completed it is mixed with the grafting monomer under conditions of rapid agitation. The temperature at which this step is conducted is not particularly critical and, in general, room temperature is satisfactory. The temperature should be such as to maintain the grafting monomer in the liquid state. The grafting reaction will normally be completed within a relatively short time, of the order of 5 minutes or so.

When the irradiated backbone polymer containing free radicals is added to the pure grafting monomer or to a solution of the monomer, the number of side chains that will be initiated on the backbone depends solely on the number of free radicals that have been introduced into the backbone polymer. The length of the side chains will be a function of the concentration of monomer in the total mixture. The more dilute the monomer, the shorter the length of the side chain. The total amount of monomer which reacts is thus a function of the number of radicals introduced with the backbone polymer and of the monomer concerned, but is not a function of the total amount of monomer present.

*Example 1*

A commercially available sample of octyl methacrylate was washed with a solution of 20% sodium chloride and 5% sodium hydroxide to remove the polymerization inhibitor that it contained and was then dried with anhydrous magnesium sulfate. A 10 percent solution of inhibitor-free monomer in hexane was prepared and irradiated with a Co-60 source to a dosage of $4 \times 10^6$ rep. Polyoctyl methacrylate was precipitated by pouring the hexane solution into excess methanol. The polymer was washed with methanol and the solvent removed under vacuum and refrigerated until used. The molecular weight was approximately 10,000 Staudinger.

*Example 2*

Using the procedure of Example 1, polyoctyl acrylate was prepared from a commercially available sample of octyl acrylate. The polymer obtained had a molecular weight of approximately 4,000 Staudinger.

*Example 3*

Solutions of the polyoctyl methacrylate of Example 1, the polyoctyl acrylate of Example 2, and a commercially available sample of polymethyl methacrylate having a molecular weight of approximately 100,000 were each prepared in 10 weight percent concentration in benzene. Each of the solutions was irradiated by mixed reactor flux pile radiation at 32° F. under vacuum. The total radiation dose after 20 minutes of the radiation was $3.6 \times 10^7$ rep. After irradiation was complete, each sample was mixed with N-vinyl pyrrolidone. Reaction was completed within a few minutes. The solvent and excess monomer were then removed from the product by distillation and the residue was fractionated and analyzed. The fractionation was conducted in the following manner: The residue remaining after distillation of solvent and excess monomer under reduced pressure on a steam bath was dissolved in 200 cc. of acetone and the polymer was precipitated from solution by the addition of successive 200 cc. portions of methanol. After each addition of methanol, the precipitated polymer was centrifuged and removed from the solution still remaining. Solvent was removed by evaporation from the separated solution remaining after the last fractionation. The evaporation residue was then extracted with water to remove unreacted vinyl pyrrolidone and homopolymer. The analyses of the various fractions are presented in Tables I, II, and III.

TABLE I.—ANALYSIS OF GRAFT COPOLYMER FROM VINYL PYRROLIDONE AND POLYMETHYL METHACRYLATE

| Fraction | Polymer Grafting Index | Percent Nitrogen |
|---|---|---|
| 2 | 102.0 | 1.07 |
| 3 | 4.0 | 2.22 |
| Residue | 80.0 | 8.27 |

TABLE II.—ANALYSIS OF GRAFT COPOLYMER FROM VINYL PYRROLIDONE AND POLYOCTYL METHACRYLATE

| Fraction | Polymer Grafting Index | Percent Nitrogen |
|---|---|---|
| 1 | 40.0 | 1.41 |
| 2 | 16.0 | 3.57 |
| 3 | 6.0 | 3.78 |
| Residue | 748.0 | 11.08 |

TABLE III.—ANALYSIS OF GRAFT COPOLYMER FROM VINYL PYRROLIDONE AND POLYOCTYL ACRYLATE

| Fraction | Polymer Grafting Index | Percent Nitrogen |
|---|---|---|
| 1 | 90.0 | 0.68 |
| 2 | 10.0 | 0.93 |
| Residue | 176.0 | 9.38 |

The Polymer Grafting Index used in the above tables is a numerical indication of the relative amounts of graft polymer in each of the fractions. It is calculated from the formula:

$$\text{Index} = \frac{\text{weight of the fraction}}{\text{Total weight of original backbone polymer}} \times 100$$

Changes in solubility of the end products over the original polymer in each case, and the presence of nitrogen in the products, show that grafting had occurred.

*Example 4*

In the manner of Example 3, solutions of polyoctyl acrylate (POA), polyoctyl methacrylate (POMA) and polymethyl methacrylate (PMMA) of various weight concentrations in toluene were irradiated under the conditions of Example 3 and then grafted with N-vinyl pyrrolidone in the same manner as in that example. Fractionation and analysis were also run in the manner described therein. The results are presented in Table IV.

It is evident from these results, as compared to those of Tables I to III, that while graft copolymers were formed, benzene was a better medium than toluene for the free-radical-induced grafting. Higher concentrations of polymer in solution in the irradiating step did give somewhat better results than lower concentrations.

TABLE IV.—TOLUENE SOLUTION GRAFTING OF COPOLYMERS

| Backbone Polymer | Conc., wt. percent | Polymer Grafting Index | | Percent Nitrogen | |
|---|---|---|---|---|---|
| | | First Fraction | Residue | First Fraction | Residue |
| POA | 10 | 60.0 | 20.0 | 0.26 | 7.38 |
| POMA | 10 | 60.0 | 30.0 | 0.17 | 4.48 |
| POMA | 30 | 48.0 | 50.0 | 0.28 | 3.75 |
| POMA | 40 | 41.0 | 87.5 | 0.48 | 7.45 |
| PMMA | 10 | 80.0 | 12.0 | 0.39 | 5.92 |
| PMMA | 30 | 48.0 | 47.0 | 0.48 | 7.08 |

The graft copoylmers of this invention may be added to mineral lubricating oils in concentration ranges of from about 1 to 15 weight percent, depending on the particular copolymer used, the particular base stock to which it is added, and the degree of viscosity index improvement desired. Certain of the copolymers will be found to be useful as sediment dispersers for heating oils in which they may be present in ranges of up to 0.1 weight percent concentration and more generally in the range of about 0.002 to 0.05 weight percent.

It is to be understood that the specific examples herein presented are primarily for the purpose of illustrating the invention and are thus not to be construed as limiting the invention in any manner. The appended claims define the scope of the invention.

What is claimed is:
1. A process for preparing a graft copolymer which comprises subjecting a polymer of methyl methacrylate dissolved in benzene to high energy ionizing radiation and thereafter contacing the irradiated solution with N-vinyl pyrrolidone, said irradiation being conducted at a temperature less than 100° F. and at a radiation rate in the range of from 0.01 to 100 megarep per minute for a total dosage in the range of from $1 \times 10^5$ to $1 \times 10^9$ rep.

2. A process for preparing a graft copolymer which comprises subjecting a solution of a polymer of octyl methacrylate in benzene to high energy ionizing radiation and thereafter contacting the irradiated solution with N-vinyl pyrrolidone, said irradiation being conducted at a temperature less than 100° F. and at a radiation rate in the range of from 0.01 to 100 megarep per minute for a total dosage in the range of from $1 \times 10^5$ to $1 \times 10^9$ rep.

3. A process for preparing a graft copolymer which comprises subjecting a solution of a polymer of octyl acrylate in benzene to high energy ionizing radiation and thereafter contacting the irradiated solution with N-vinyl pyrrolidone, said irradiation being conducted at a temperature less than 100° F. and at a radiation rate in the range of from 0.01 to 100 megarep per minute for a total dosage in the range of from $1 \times 10^5$ to $1 \times 10^9$ rep.

References Cited

UNITED STATES PATENTS

| 2,926,126 | 2/1960 | Graham et al. | 204—159.16 |
| 2,956,899 | 10/1960 | Cline | 204—159.16 |
| 3,066,085 | 11/1962 | Smith et al. | 204—159.17 |
| 3,087,875 | 4/1963 | Graham et al. | 204—159.16 |
| 3,088,931 | 5/1963 | Scanley et al. | 204—159.15 |
| 3,131,138 | 4/1964 | Durop et al. | 204—159.17 |

SAMUEL H. BLECH, *Primary Examiner.*

JOHN R. SPECK, MURRAY TILLMAN, *Examiners.*

W. L. BASCOMB, R. B. TURER, *Assistant Examiners.*